June 24, 1958   H. F. MINTER ET AL   2,840,538
POLYESTER RESINOUS MOLDING COMPOSITIONS AND
ELECTRICAL CONDUCTOR FORMED THEREWITH
Filed April 12, 1955
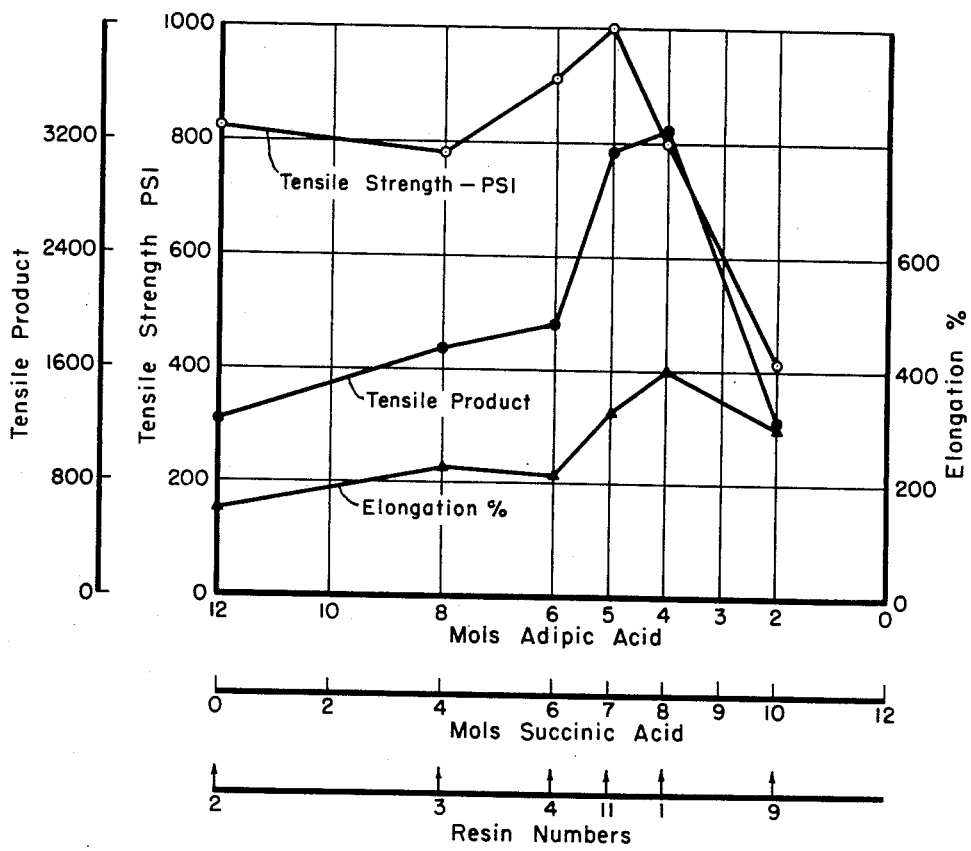
WITNESSES
INVENTORS
Herbert F. Minter
and Jack Swiss.
BY
ATTORNEY.

United States Patent Office 2,840,538
Patented June 24, 1958

2,840,538

POLYESTER RESINOUS MOLDING COMPOSITIONS AND ELECTRICAL CONDUCTOR FORMED THEREWITH

Herbert F. Minter, Pittsburgh, and Jack Swiss, Franklin Township, Westmoreland County, Pa., assignors to Westinghouse Electric Corporation, East Pittsburgh, Pa., a corporation of Pennsylvania Application April 12, 1955, Serial No. 500,764

9 Claims. (Cl. 260—40)

The present invention relates to resinous molding compositions and has particular reference to resinous molding compositions including mixtures of certain polyester resins and specific fillers which mixtures are convertible to tough and elastic products.

For some time it has been a problem in the electrical industry to provide resinous molding compositions which will thermoset to tough and elastic molding compositions which retain satisfactory elastomeric properties at temperatures within the range of from —50° C. to 200° C. and higher. To be completely satisfactory such resinous molding compositions also must be adaptable for molding about metallic electrical conductors and be capable of withstanding cycling over extreme variations in temperature for relatively long periods of time without cracking or separating from the metallic member.

In copending application Serial No. 399,576 to Minter et al., which application is assigned to the assignee of the present invention, there are disclosed resinous molding compositions which to a large degree satisfy the requirements of a molding resin as set forth hereinabove. Such compositions include polyester resins derived by reacting, under certain specified conditions, one mol of at least one unsaturated acid, e. g., fumaric acid, and from 10 to 15 mols of adipic acid with certain glycols.

We now have discovered that resinous molding compositions having physical and chemical properties superior even to those of the compositions described in the said copending application Serial No. 399,576 are obtainable when the specific polyester resins, described more fully hereinbelow, are employed in preparing the compositions.

The object of the present invention is to provide moldable resinous compositions including mixtures of certain polyester resins and fillers which thermoset to tough and elastomeric solid products having improved physical and chemical properties.

Another object of the invention is to provide moldable resinous compositions which are tough and elastomeric products of improved physical and chemical properties which are suitable for use as insulation on electrical apparatus.

Other and further objects of the invention will, in part, be obvious and will, in part, appear hereinafter.

For a more complete understanding of the present invention reference is made to the following description taken in conjunction with the accompanying drawing in which the single figure thereof is a graph illustrating the tensile strength, percent elongation and tensile product of certain resinous molding compositions.

In the attainment of the foregoing objects and in accordance with the present invention there are provided resinous molding compositions which thermoset to a tough and elastic solid comprising an intimate admixture of (A) from 10 to 70 parts by weight of a finely divided solid filler of an average particle size of below one micron and (B) from 90 to 30 parts by weight of a polyester resin derived by heating above 150° C. but not exceeding 250° C. (a) one mol of at least one unsaturated dicarboxylic acidic compound selected from the group consisting of fumaric acid, maleic acid, maleic anhydride, citraconic anhydride, and citraconic acid, (b) from 3 to 5 mols of adipic acid, (c) from 7 to 9 mols of succinic acid, (d) from 0.5 to 5 mols of propylene glycol, and (e) from 14 to 9 mols of ethylene glycol, the glycols providing sufficient hydroxyl groups to exceed by at least 5% but not over 15% the number of carboxyl groups in the acidic compounds.

These resinous molding compositions cure to a tough and elastic solid upon heating in the presence of from 0.5% to 5% by weight, based on the weight of the polyester resin, of at least one vinyl addition type polymerization catalyst. The cured, solid, elastomeric product exhibits physical and chemical properties superior even to those possessed by the compositions described in the said copending application Serial No. 399,576.

The polyester resin material employed in preparing the resinous molding compositions may be prepared in accordance with usual esterification procedures. Thus the acidic materials and glycols may be heated in the presence of one or more esterification catalysts, such as mineral acids including hydrochloric and sulfuric acid, para-toluene sulfonic acid, and the like. Preferably, the esterification reaction is carried out by heating the materials, in the amounts specified above, to a temperature within the range of about 150° C. to about 250° C. The heating of the mixture is continued with stirring until a polyester resin having an acid number below 7, and preferably below 5 is produced. The reaction is considered to be complete when the viscosity of a 50% polyester resin solution in monostyrene is about K on the Gardner-Holdt scale. The viscosity of satisfactory polyesters in 50% solution in monostyrene may vary somewhat from these limits, for example from H to P, that is, 3±1 poise at 25° C. The polyester resin will be of the consistency of a thick syrup before dissolution in the solvent.

It is a feature of this invention that the polyester resin can be prepared by substituting up to 20 mol percent of the ethylene and propylene glycol with higher glycols. Thus diethylene glycol, 1,3-butylene glycol, triethylene glycol, and neopentylene glycol may be substituted for an equimolar proportion of either the ethylene or propylene glycol or both. The glycols are used in amounts sufficient to provide hydroxyl groups to exceed by at least 5% but not over 15% the number of carboxyl groups in the acidic compounds. In the case of the acid anhydrides, each anhydride of a dicarboxylic acid is considered to be equivalent to a single carboxyl group.

We also have found that glycerol may be included in amounts of from 0.1 to 0.75 mol with advantage. The optimum elastic properties combined with a thermoset condition result from the use of 0.23 to 0.35 mol of glycerol per 13 mols of the acidic compounds. However, the glycerol may be left out, and an excellent resinous composition is produced.

The polyester resinous material itself does not produce satisfactory resinous molding compositions if it simply is admixed with a polymerization catalyst and cured in the presence of heat to a thermoset solid. Satisfactory resinous molding compositions are obtainable only when 10 to 70 parts by weight of a finely divided solid filler is admixed with from 90 to 30 parts by weight of the polyester resin. The fillers may include finely divided silica, calcium carbonate, aluminum silicate, magnesium silicate, talc, iron oxides, diatomaceous earth, hydrated alumina, hydrated silicates, mica, kaolin, bentonite, and glass. The particles should have an average particle size of less than 5 and preferably less than 1 micron. If desired, the particles of the filler may be coated with a minor amount of a resin such as a melamine resin, a soap such as aluminum or magnesium stearate, an oil such as tall oil, or a fatty acid such as stearic acid.

Additional reinforcing fibrous materials may be included in the composition to replace up to 30% of the weight of the solid fillers. Suitable fibrous fillers are asbestos, cotton, nylon, acrylonitrile resin fibers and glass fibers. The fibers may be chopped or finely divided depending on the size and shape of the moldings that are to be produced. Large moldings of several inches in size will permit the incorporation of fibrous reinforcing materials having lengths of up to an inch while smaller moldable members will permit the use of fibers of lengths of ¼ to ½ inch in the composition.

In preparing the resinous molding compositions the solid fillers are intimately admixed with the polyester resin in a suitable mixing device. Excellent results have been obtained by intimately admixing the ingredients employing a two roll mill, a Banbury mixer or a pug mill. Inasmuch as a relatively large amount of filler is incorporated in the compositions a relatively thick, pasty, high viscosity putty-like material is obtained. If desired, limited amounts of plasticizers such as tricresyl phosphate, dioctyl phthalate and the like may be introduced into the composition to assist in maintaining the putty-like nature of the resinous material during periods of storage.

While their use is not essential, a relatively small proportion of one or more polymerization inhibitors may be incorporated in the putty-like material to aid in extending its storage or shelf life by preventing premature polymerization. Inhibitors which are suitable for this purpose include substituted phenols and aromatic amines. More specific examples of suitable polymerization inhibitors include hydroquinone, resorcinol, tannin, and sym. alpha, beta naphthyl p-phenylene diamine, and N-phenyl beta naphthylamine. The inhibitor, if employed, should be present in only relatively small proportions. Thus, amounts less than about 1.0% should be used, with amounts as small as about 0.01% to about 0.1% by weight generally being sufficient.

Just prior to the intended use of the resinous molding composition a minor amount of at least one vinyl addition type polymerization catalyst is thoroughly admixed with the composition.

Polymerization catalysts which are suitable for incorporation in the composition are the organic peroxides and hydroperoxides used to effect vinyl type polymerization. Compounds capable of furnishing free radicals which accelerate addition polymerization may be included with the peroxide catalysts. Examples of such catalysts are benzoyl peroxide, tertiary butyl hydroperoxide, ditertiary butyl peroxide, t-butyl perbenzoate and di-t-butyl diperphthalate. The catalysts may be incorporated into the compositions several days previous to their being molded without any adverse results. We have stored compositions containing 1½% of benzoyl peroxide for 12 days at 100° F. and as long as four months at ambient summer temperatures, without loss of any desirable molding property.

In order to indicate even more fully the nature and capabilities of the resinous molding compositions of the present invention the following examples are set forth.

EXAMPLE I

A polyester resin is prepared by charging the following ingredients into a reaction vessel equipped with a stirrer, gas sparging means, and an air condenser:

| | Mols |
|---|---|
| Adipic acid | 4.0 |
| Succinic acid | 8.0 |
| Fumaric acid | 1.0 |
| Propylene glycol | 2.3 |
| Ethylene glycol | 12.0 |

The stirrer was put into operation and carbon dioxide gas was admitted to sparge the vessel. The vessel then was heated gradually to a temperature between 160° C. and 180° C., the condenser being operated for the first several hours of the esterification reaction to return any glycol to the reaction zone that was entrained with any of the water evolved during the reaction. The condenser then was disconnected and the vessel was heated to 225° C. and maintained at that temperature for 18 to 30 hours. The viscosity of the polyester increased gradually and the reaction was stopped when the polyester had a viscosity of K on the Gardner-Holdt scale for a 50% solution in monostyrene at 25° C. The polyester had an acid number of 5 at that time.

It has been determined that esterification is aided when azeotropic distillation procedures are employed to carry off the water formed during the reaction. The removal of water formed during the esterification reaction is facilitated by carrying out the esterification in the presence of an azeotroping volatile organic liquid such as toluene, xylene, or the like.

Other polyester resins have been prepared following the procedure described in Example I employing minor changes in the reactants. Thus, the glycol mixture has been varied to comprise as little as 0.5 mol up to 5 mols of propylene glycol, the amount of ethylene glycol employed being varied correspondingly to maintain the total number of mols of glycol constant. Highly satisfactory results have been obtained employing the glycerol in amounts within the range of 0.25 to 0.35 mol.

EXAMPLE II

About 75.8 parts by weight of the polyester resin prepared in accordance with the procedure described in Example I are thoroughly admixed on a cold two roll mill with about 24.2 parts by weight of a solid filler comprising a finely divided silica having an average particle size of less than one micron. After milling for about 15 minutes there is added to the milled composition 3% by weight, based on the weight of the polyester resin, of a 50% dispersion of benzoyl peroxide in tricresyl phosphate. After a few more minutes of milling a material of pasty-like consistency is obtained. The pasty material was molded at 125° C., with a five minute cure, into panels 4 inches square having a thickness of about 90 mils. Samples were cut therefrom with an ASTM tensile specimen die D. Cross-head speed of the tensile machine was 12 inches per minute and tests were conducted on the samples at approximately 25° C. The tensile strength, percent elongation and tensile product data obtained from these tests are set forth in the following table. The resin prepared in accordance with the procedure described in Example II is identified in the table as resin No. 1. For comparison purposes additional resin compositions, differing in the amount of acids and glycols used, also were prepared. A resin molding composition as described in copending application Serial No. 399,576 also was prepared and tested. That resin is identified in the following table as resin No. 2.

Table

| Resin No. | Composition in Mols | | | | | Tensile Strength (p. s. i.) | Percent Elongation | Tensile Product |
|---|---|---|---|---|---|---|---|---|
| | Acids | | | Glycols | | | | |
| | Adipic | Succinic | Fumaric | Propylene | Ethylene | | | |
| 1 | 4 | 8 | 1 | 2.3 | 12.0 | 800 | 410 | 3,280 |
| 2 | 12 | | 1 | 2.3 | 12.0 | 824 | 150 | 1,230 |
| 3 | 8 | 4 | 1 | 2.3 | 12.0 | 780 | 225 | 1,752 |
| 4 | 6 | 6 | 1 | 2.3 | 12.0 | 915 | 210 | 1,920 |
| 5 | 4 | 8 | 1.5 | 2.3 | 12.0 | 1,025 | 140 | 1,432 |
| 6 | 4 | 8 | 2.0 | 2.3 | 12.0 | 850 | 70 | 595 |
| 7 | 4 | 8 | 1.5 | | 14.2 | 958 | 185 | 1,775 |
| 8 | 6 | 3 | 1 | 2.0 | 8.5 | 1,112 | 175 | 1,950 |
| 9 | 2 | 10 | 1 | 2.3 | 12.0 | 414 | 300 | 1,242 |
| 10 | 4 | 8 | 1 | 2.3 | 12.0 | 296 | 330 | 976 |
| 11 | 5 | 7 | 1 | 2.3 | 12.0 | 1,000 | 315 | 3,150 |
| 12 | 4 | 8 | 1 | 3.5 of 1,4-butanediol. | 10.5 | 1,452 | 125 | 1,815 |
| 13 | 12 | | 1 | 4.7+4.7 of 1,4-butanediol. | 4.7 | 800 | 200 | 1,600 |
| 14 | 4 | 8 | 1 | 2.3 | 12.0+0.5 of glycerol. | 1,011 | 110 | 1,112 |

The values in the table in the column headed "Tensile Product" were obtained using the equation:

$$\text{Tensile product} = \frac{\text{Tensile strength (p. s. i.)} \times \text{percent elongation}}{100}$$

Tensile product values are convenient for evaluation and where, as here, there is a balance between tensile strength and percent elongation, the higher the tensile product value the better the resin is as an elastomer. The good balance and high value for resins No. 1 and 11 emphasize the criticality of preparing polyester resins using 3 to 5 mols of adipic acid and from 7 to 9 mols of succinic acid for each mol of unsaturated dicarboxylic acid, e. g., fumaric acid.

To illustrate more clearly the data set forth in the above table reference is made to the accompanying drawing wherein there is set forth a graph on which is plotted the tensile strength, percent elongation and tensile product data obtained for resins Nos. 1, 2, 3, 4, 9 and 11. As illustrated on the graph the most satisfactory resinous molding compositions are those which contain a polyester resin which has been prepared using from 3 to 5 mols of adipic acid and from 7 to 9 mols of succinic acid. When these acids are used in molar amounts outside the ranges specified and the resultant polyesters are included in resinous molding compositions a product is obtained which has less than satisfactory properties.

The data set forth in the above table and illustrated in the accompanying drawing points up clearly the improvement obtained in a resinous molding composition containing the polyester resin of this invention. Such improvement was unexpected. Normally it would be expected that the replacement of adipic acid by succinic acid would produce a more rigid and less extensible resin because the four carbon chain of succinic acid is considerably stiffer than the longer and more flexible six carbon chain of adipic acid. The reason for the improvement is not completely understood at the present time but it is believed that such improvement is explainable by the fact that the combination of the acids produces a longitudinal chain disorder permitting fewer dipoles to interact and hence decreasing the rigidity attributable to regularly recurring, hence alignable, polar groups.

A further important and as yet unexplained feature of the present invention is the fact that the resinous molding compositions herein described exhibit exceptionally high retention of flexibility characteristics on aging. Thus, it has been observed that even after short curing periods of from 1 to 3 hours at 135° C. all of the resinous molding compositions, with the exception of the composition of this invention (identified as resin No. 1 in the above table and in the drawing), fail when bent 180° and creased. By way of contrast, after a 48-hour curing period at 135° C. the composition of this invention (identified as resin No.1) still did not fail when so bent and creased.

While the present invention has been described with reference to particular embodiments thereof it will be understood of course that certain changes, substitutions, modifications and the like may be made therein without departing from its true scope.

We claim as our invention:

1. A resinous molding composition which thermosets to a tough and elastic solid comprising an intimate admixture of (A) from 10 to 70 parts by weight of a finely divided filler at least 70% by weight of which is a non-fibrous solid filler of an average particle size of below one micron and (B) from 90 to 30 parts by weight of a polyester resin derived by heating above 150° C. but not exceeding 250° C. (a) one mol of at least one unsaturated dicarboxylic acidic compound selected from the group consisting of fumaric acid, maleic acid, maleic anhydride, citraconic anhydride, and citraconic acid, (b) from 3 to 5 mols of adipic acid, (c) from 7 to 9 mols of succinic acid, (d) from 0.5 to 5 mols of propylene glycol, and (e) from 14 to 9 mols of ethylene glycol, the glycols providing sufficient hydroxyl groups to exceed by at least 5% but not over 15% the number of carboxyl groups in the acidic compounds.

2. The composition of claim 1 wherein the polyester resin is obtained by heating the acidic components and the glycols until the polyester has an acid number no higher than 7 and a viscosity as measured on the Gardner-Holdt scale of from about H to P in a 50% monostyrene solution.

3. The composition of claim 1 wherein up to about 30% of the weight of the finely divided inorganic filler is replaced with a fibrous filler.

4. The composition of claim 1 which contains at least one polymerization inhibitor.

5. The composition of claim 1 wherein a vinyl addition type polymerization catalyst promoting polymerization of the polyester resin is added in an amount equal to from ½% to 5% by weight of the polyester resin.

6. The composition of claim 1 wherein up to 20 mol percent of the ethylene glycol and the propylene glycol are replaced with an equimolar proportion of higher glycols.

7. A tough, elastomeric molded member comprising the thermoset product derived by curing a polyester resin molding composition under heat and pressure in the presence of a vinyl addition type polymerization catalyst added in an amount equal to from ½% to 5% by weight of the polyester resin, the polyester resin molding composition comprising an intimate admixture of (A) from 10 to 70 parts by weight of a finely divided filler at least 70% by weight of which is a non-fibrous solid filler of particle size of below one micron and (B) from 90 to 30 parts by weight of a polyester resin derived by heating above 150° C. but not exceeding 250° C. (a) one mol of at least one unsaturated dicarboxylic acidic compound selected from the group consisting of fumaric acid, maleic acid, maleic anhydride, citraconic anhydride, and citraconic acid, (b) from 3 to 5 mols of adipic acid, (c) from 7 to 9 mols of succinic acid, (d) from 0.5 to 5 mols of propylene glycol, and (e) from 14 to 9 mols of ethylene glycol, the glycols providing sufficient hydroxyl groups to exceed by at least 5% but not over 15% the number of carboxyl groups in the acidic compounds, and the heating being continued until the polyester has an acid number no higher than 7 and a viscosity as measured on the Gardner-Holdt scale of from about H to P in a 50% monostyrene solution.

8. An electrical member comprising an electrical conductor and a body of molded insulation applied thereto, the insulation comprising the tough, elastomeric, thermoset, resinous product derived by curing a polyester resin molding composition under heat and pressure in the presence of a vinyl addition type polymerization catalyst added in an amount equal to from ½% to 5% by weight of the polyester resin, the polyester resin molding composition comprising an intimate admixture of (A) from 10 to 70 parts by weight of a finely divided filler at least 70% by weight of which is a non-fibrous solid filler of particle size of below one micron and (B) from 90 to 30 parts by weight of a polyester resin derived by heating above 150° C. but not exceeding 250° C. (a) one mol of at least one unsaturated dicarboxylic acidic compound selected from the group consisting of fumaric acid, maleic acid, maleic anhydride, citraconic anhydride, and citraconic acid, (b) from 3 to 5 mols of adipic acid, (c) from 7 to 9 mols of succinic acid, (d) from 0.5 to 5 mols of propylene glycol, and (e) from 14 to 9 mols of ethylene glycol, the glycols providing sufficient hydroxyl groups to exceed by at least 5% but not over 15% the number of carboxyl groups in the acidic compounds, and the heating being continued until the polyester has an acid number no higher than 7 and a viscosity as measured on the Gardner-Holdt scale of from about H to P in a 50% monostyrene solution.

9. A resinous molding composition which thermosets to a tough and elastic solid comprising an intimate admixture of (A) from 10 to 70 parts by weight of a finely divided filler which comprises at least 70% by weight of hydrated alumina of an average particle size of below one micron and (B) from 90 to 30 parts by weight of a polyester resin derived by heating above 150° C. but not exceeding 250° C. (a) one mol of at least one unsaturated dicarboxylic acidic compound selected from the group consisting of fumaric acid, maleic acid, maleic anhydride, citraconic anhydride, and citraconic acid, (b) from 3 to 5 mols of adipic acid, (c) from 7 to 9 mols of succinic acid, (d) from 0.5 to 5 mols of propylene glycol, and (e) from 14 to 9 mols of ethylene glycol, the glycols providing sufficient hydroxyl groups to exceed by at least 5% but not over 15% the number of carboxyl groups in the acidic compounds.

References Cited in the file of this patent

UNITED STATES PATENTS

| 2,388,319 | Fuller | Nov. 6, 1945 |
| 2,743,309 | Lindsay et al. | Apr. 24, 1956 |

OTHER REFERENCES

"The Technology of Plastics and Resins," by Mason et al. (1945), page 399.